United States Patent [19]
Schröder

[11] 4,151,816
[45] May 1, 1979

[54] AIR OR AIR AND FUEL MIXTURE FLOW CONTROL IN VALVE CONTROLLED INTERNAL COMBUSTION ENGINES

[75] Inventor: Joachim Schröder, Neusäss, Fed. Rep. of Germany

[73] Assignee: Maschinenfabrik Augsburg-Nurnberg Aktiengesellschaft, Augsburg, Fed. Rep. of Germany

[21] Appl. No.: 823,833

[22] Filed: Aug. 11, 1977

[30] Foreign Application Priority Data

Aug. 24, 1976 [DE] Fed. Rep. of Germany ....... 2637985

[51] Int. Cl.² ............................................. F02B 31/00
[52] U.S. Cl. .................................. 123/75 B; 123/141; 123/188 AF
[58] Field of Search ............... 123/75 B, 141, 188 AF, 123/188 UA, 188 M

[56] References Cited

U.S. PATENT DOCUMENTS

| 1,300,015 | 4/1919 | Reed | 123/141 |
|---|---|---|---|
| 1,526,963 | 2/1925 | Chandler | 123/141 |
| 1,555,991 | 10/1925 | Konar | 123/188 UA |
| 2,740,392 | 4/1956 | Hollingsworth | 123/188 UA |
| 2,882,873 | 4/1959 | Witzky | 123/188 UA |
| 2,900,971 | 8/1959 | Kauffmann et al. | 123/188 M |
| 3,313,278 | 4/1967 | Thuesen | 123/188 M |
| 3,653,368 | 4/1972 | Scherenberg | 123/188 AF |

FOREIGN PATENT DOCUMENTS

| 2313656 | 10/1974 | Fed. Rep. of Germany | 123/188 AF |
|---|---|---|---|
| 1310028 | 10/1962 | France | 123/188 AF |

Primary Examiner—Ira S. Lazarus
Attorney, Agent, or Firm—Flynn & Frishauf

[57] ABSTRACT

In order to provide a controlled turbulence or angular momentum of air, air and fuel mixtures or similar fluids to be injected into the cylinder chamber of valve controlled internal combustion engines, control vanes are provided in close proximity to the valve retaining ring. The vanes deflect the flow of the air or air/fuel mixture without restricting the flow thus increasing the fuel flow coefficient. The vanes are curved to accommodate the fluid in-flow while ensuring controlled turbulence or angular momentum of the fluid in the cylinder chamber. The vanes can be arranged on a ring which is fastened in the inlet chamber in close proximity to the valve retaining ring.

14 Claims, 6 Drawing Figures

AIR OR AIR AND FUEL MIXTURE FLOW CONTROL IN VALVE CONTROLLED INTERNAL COMBUSTION ENGINES

BACKGROUND OF THE INVENTION

1. Field of the Invention

The present invention relates to an arrangement for controlling the direction of the air or air and/or fuel mixture passed to the cylinder of an internal combustion engine. More particularly, this invention is concerned with a valve seat arrangement permitting a fluid to be added applying a controlled angular momentum to the charge air being fed to the cylinder chamber of a Diesel engine, to cause controlled turbulence of the fluid in the cylinder chamber thereof.

2. Description of the Prior Art

In German Published Patent Application No. 1,904,378 there is disclosed a device comprising a sickle-shaped retaining bar which extends approximately perpendicularly with respect to the direction of the flow of the cylinder air into the inlet passage. This device has certain advantages over other known devices. For one, it permits rotation of the valve during the stroke of the piston. In contradistinction with angular momentum causing, approximately spirally formed inlet grooves or channels, the device of DT-AS No. 1,904,378 provides for a less complex cylinder block design.

However, the provision of such a retaining bar in the inlet passage will cause a certain degree of fuel flow retardation or a throttling effect and, thus, will lower the flow coefficient of the system. At peak load, the fresh air input will thus be below the value which could flow without any obstacle being present in the inlet passage. This, however, means that, under otherwise identical operating conditions, the output of the engine will be reduced.

It is an object of the present invention to increase the effective flow coefficient of the cylinder mixture to be added to a cylinder chamber of an internal combustion engine.

SUMMARY OF THE INVENTION

Briefly, in accordance with the present invention, a valve seat arrangement is provided which comprises a plurality of guide vanes extending along the inside wall of the inlet passage or duct to the cylinder chamber of a valve controlled internal combustion engine. The vanes extend into the inlet opening and are inclined towards the central longitudinal axis of the valve.

The arrangement according to the present invention has the advantage that, due to the configuration of the guide vanes, i.e. due to the formation of an angular momentum or controlled turbulence in the fluid to be passed to the cylinder chamber, an efficient combustion under varying load conditions is feasible. Furthermore, the engine can achieve greater maximum output in comparison to prior art type engines. In addition, the device of the present invention can subsequently be installed into combustion engines.

Advantageously, the valve seat arrangement is arranged in a section within the inlet opening or passage, in the direction of the longitudinal axis of the valve, directly above the valve retainer seat. It has been found that with this arrangement, with a given insert having vanes, a maximum angular momentum of fuel fluid flow can be produced.

In order to maintain the flowrate at a maximum level, the guide vane inlet section extends approximately in the general direction of the inflowing air or fluid stream. A sufficiently large angular momentum is achieved when the guide vane exit section extends under an angle of from 20° to 40° with respect to a line perpendicular to the longitudinal axis of the valve.

It has further been determined that a sufficiently high flowrate is maintained, while achieving an adequate angular momentum, when the ratio of chord of each vane to value of vane distribution is from 0.8 to 1.2.

The vanes are preferably arranged uniformly over the inner diameter of the inlet passage. This is the preferred arrangement when using the valve seat arrangement in combustion engines having only one valve.

Combustion engines having more than one inlet valve are fitted, in accordance with another feature of the present invention, only partially with guide vanes. The guide vanes are preferably arranged so that the respective exit sections will direct the air or fluid flow directly into the cylinder chamber adjacent the inlet passage. This measure will ensure that when two vane arrangements are employed that the two air streams, respectively directed by separate inlet valves, will not adversely influence each other, which, in turn, will ensure an angular momentum of the entire airflow admitted to the cylinder chamber.

DESCRIPTION OF THE PREFERRED EMBODIMENTS

Figure 1:
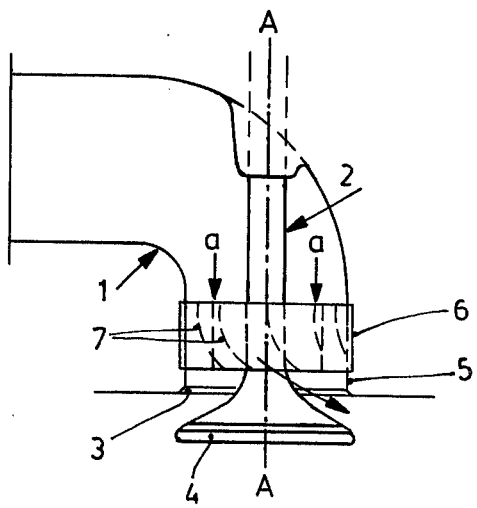
FIG. 1 shows in side elevation a schematic representation of the valve seat arrangement in accordance with the present invention.
Figure 2:
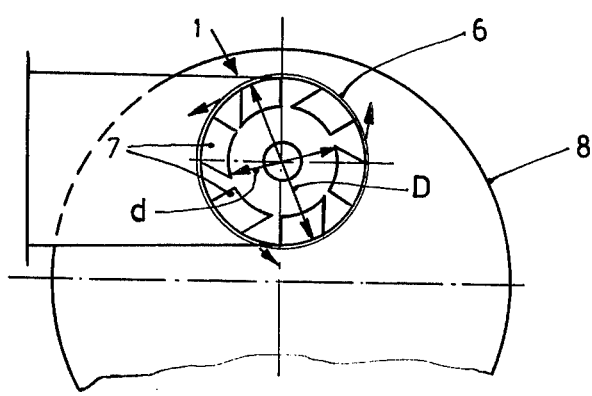
FIG. 2 is a plan view of the representation shown in FIG. 1.

In the embodiment shown in FIGS. 1 and 2, numeral 1 designates the inlet opening or passage or channel for fluids such as air, air/fuel mixtures or fuel entering into a cylinder chamber 8, not shown in detail and numeral 2 designates an inlet valve. The inlet opening 1 comprises a substantially tubular or cylindrical channel section 5, concentric with the longitudinal valve axis A—A, which adjoins a valve seat ring designated 3, cooperating with a conical head portion 4 of valve 2, as can best be seen in FIG. 1. A vane holding or retaining ring 6 is located in the inlet section 5 as will be described in greater detail below. The vane ring 6 comprises six vanes 7 radially extending from the inner diameter of the ring 6 towards the center of the system. As can best be seen in FIG. 1, the vanes are curved or inclined with respect to the axis A—A.

Figure 3:
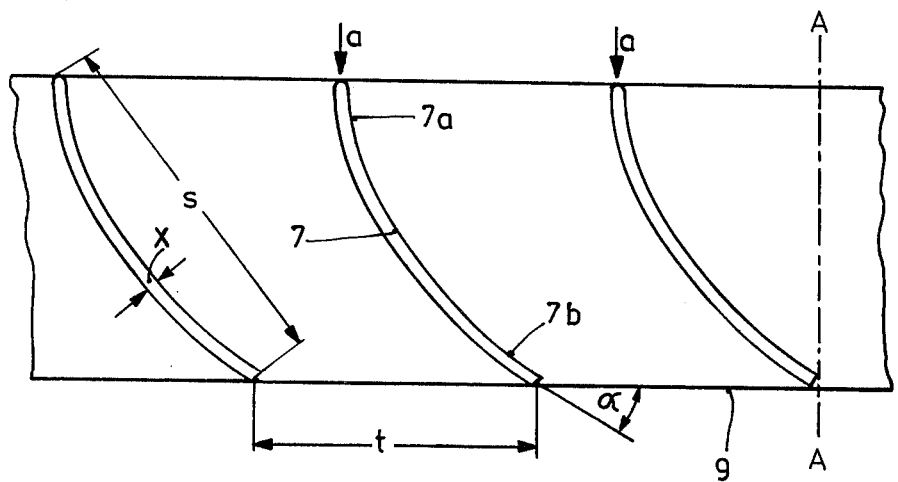
FIG. 3 shows a portion of the lay-out of the vanes on the inner circumference of the vane ring, showing the portion in development.

The details of the vanes 7 are shown in better detail in FIG. 3 in which the thickness x of each vane is constant x. The vanes can be of a constant thickness as shown or they can be shaped in the manner of aerodynamic wings, or in other shapes which will produce effective angular momentum of the fluid that is directed against them for admission to the cylinder chamber 8. The inlet section 7a of each vane 7 is approximately parallel to the valve axis A—A and aligned with the flow direction as shown by arrows a, in order to reduce any resistance against fluid passage. The inlet section 7a can, however, also be slightly inclined with respect to direction a A—A. The exit portion 7b of each vane 7 extends sloped with respect to the line designated 9 in FIG. 3 which line is at right angles with axis A—A and, thus, the exit sections form an angle $\alpha$ with line 9. In the embodiment developed in FIG. 3, the angle $\alpha$ is approximately 30°.

The angle $\alpha$ should be selected from the range of 20° to 40° in order to ensure, on the one hand, that a sufficient angular momentum is attained and, on the other hand, to ensure that the least resistance to air or fuel flow is produced.

As is also shown in FIG. 3, the letter s designates the chord of the curved vane 7 which is continuously curved between inlet section 7a and exit section 7b. The vanes are distributed over the inner diameter D, see FIG. 2, at an equal distance t. The ratio of s:t is shown to be about 1.2:1. Advantageously, the ratio is selected from the range of 0.8 to 1.2. Thus, the angular momentum or deflection will be sufficient while maintaining a high flow coefficient. Especially if the diameter designated d in FIG. 2, maintained in relation to the diameter D in a ratio of from 0.5 to 0.7. These proportions in such a selection ensure that a sufficient quantity of air or fluid, typically flowing through the inlet channel is redirected by the vanes from a straight line motion into an angular or diverted motion while a further portion of air, in the region of diameter d, can pass directly, without frictional losses, into the cylinder chamber 8.

Figure 4:
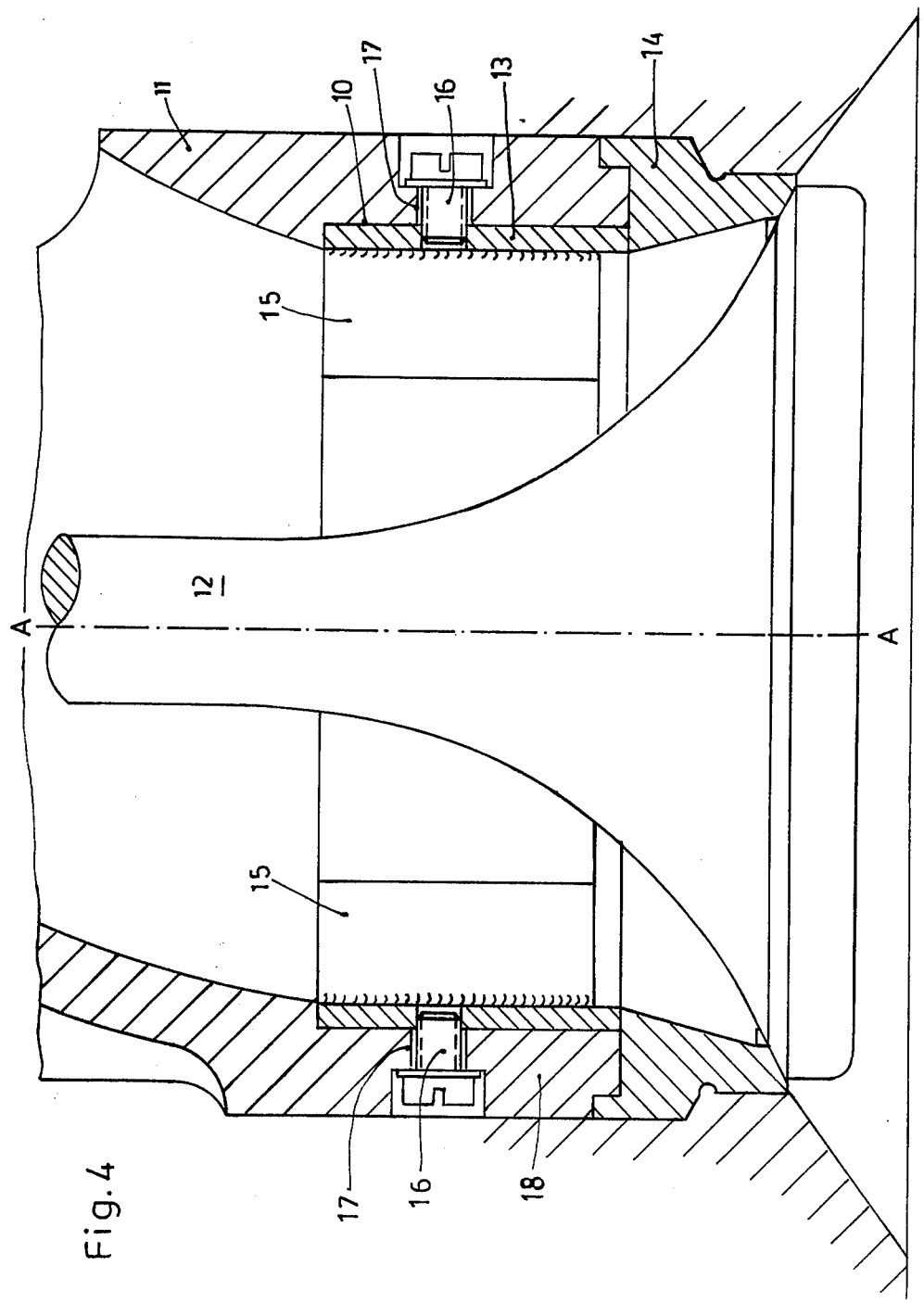
FIG. 4 is a cross-section of a representation similar to FIG. 1 with the valve seat insert and the adjoining valve details drawn in a larger scale.
Figure 5:
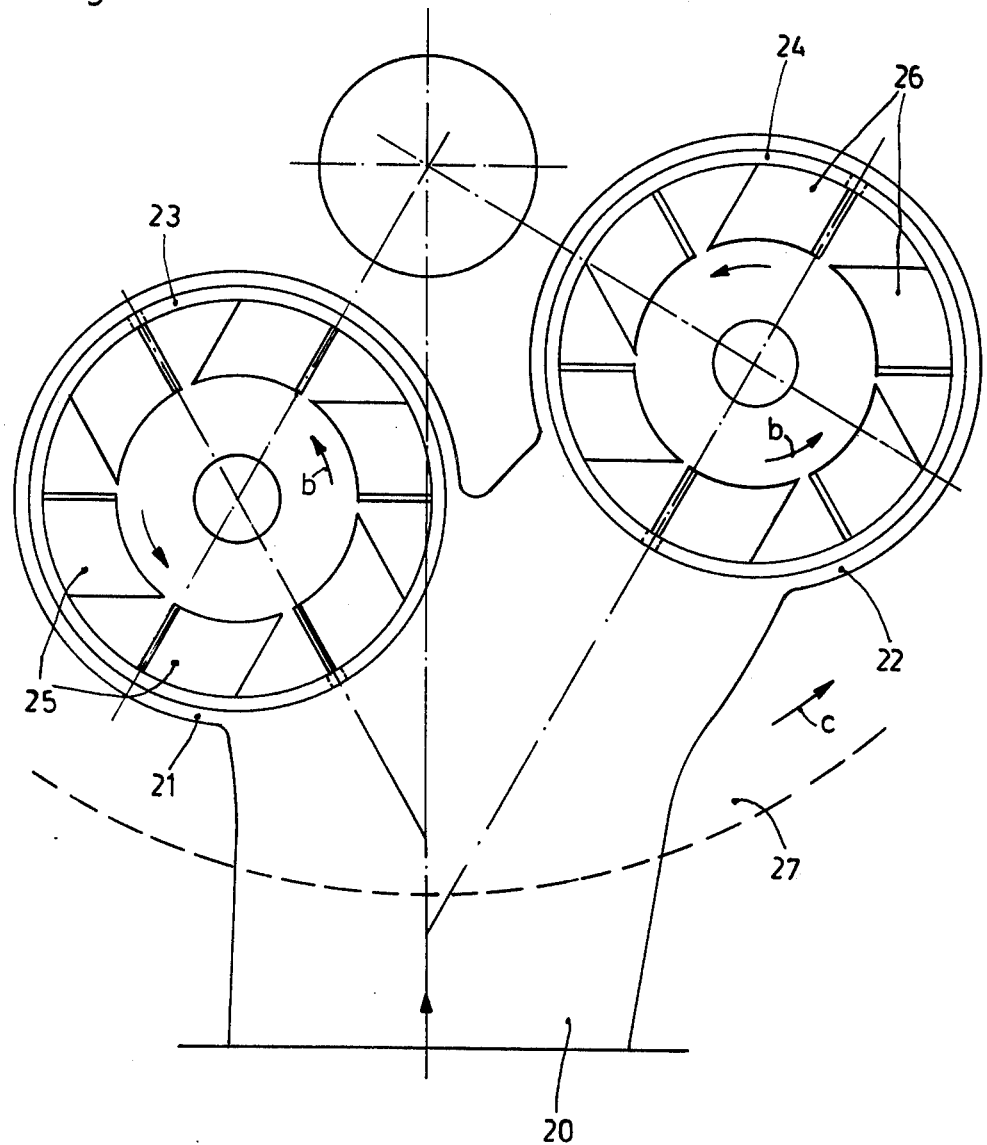
FIG. 5 shows in plan view the arrangement using two inlet valves.

FIG. 4 of the drawings shows in greater detail the manner in which the vane ring can be attached to the cylinder block. Thus, a vertical bore 10 receives the vane ring 13 which is positioned concentric in the inlet channel section 11 with the main axis A—A of valve 12. Numerals 15 designate vanes (two only shown) which are fastened to the inside wall of ring 13, e.g. by welding or are unitary therewith. The close proximity of the ring 13 with respect to the cylinder chamber is beneficial since such close proximity will ensure the desired angular momentum or deflection of the air or fuel in the cylinder chamber. Thus, in FIG. 4 the ring 13 is abutted against the valve retaining seat ring 14. The ring 13 is fastened in channel section 11 by screws 16 extending through bores 17 and into correspondingly threaded holes in the ring 13. Adjustment of the vanes is provided by making the bores 17 of a diameter or opening which will permit adjustment of the vanes with respect to axis A—A and, thus, adjustment of the angular momentum to prevail in the cylinder chamber. This adjustment will be of particular benefit in internal combustion engines having two cylinder chambers for each inlet valve. Such a system is indicated in FIG. 5. The vanes can also be made unitary with the inlet duct 18, e.g. by ingegrally casting the vanes 15 or the inlet channel 11 is being cast.

In the arrangement shown in FIG. 5, inlet channel 20 is branched into two inlet channels 21 and 22, respectively, each communicating with a single inlet valve, not shown. Each of the inlet channels 21 and 22 is provided with a valve seat ring 23 and 24, respectively, having vanes 25 and 26 arranged thereon. The vanes are arranged equidistant over the inner diameter of the ring 23 and 24, respectively. The arrangement and the function of the rings and the valve in this embodiment are equivalent to the embodiment shown in FIG. 1. In addition, the vanes provide circulation of the fluid, in a clock-wise direction as indicated by the arrows b, so that the two air or other fluid streams will be subjected to a controlled turbulence or angular momentum which in the same direction will result in an overall fluid flow in the direction generally indicated by arrow c. Thus, a maximum of angular momentum is achieved in the cylinder chamber 27.

Frequently, it has been observed that a lesser angular momentum or turbulence of the fluid to be admitted to the cylinder chamber is required. In such a case the ring 24 with vanes 26 can be omitted so that only one ring 23 with the vanes 25 is provided, to provide spiral air flow preferably the one having an inlet channel of shorter length.

Figure 6:
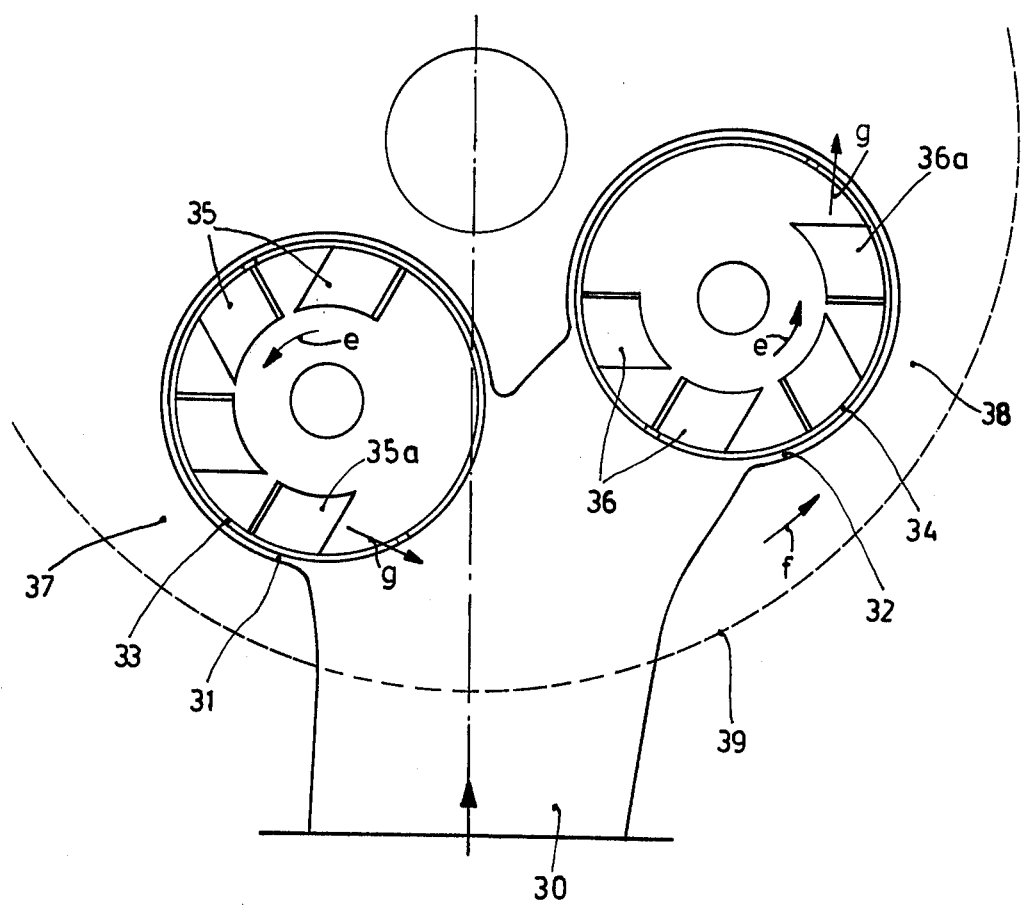
FIG. 6 shows in plan view an arrangement similar to FIG. 5 in which only portions of the inner diameter of the vane retainer ring are provided with guide vanes.

A further embodiment is shown in FIG. 6. Again, two inlet channels 31 and 32, respectively, are provided. Each channel is fitted with a valve seat ring 33 and 34. In this embodiment, the inner diameter of the rings 33 and 34 is only partially fitted with vanes 35 and 36, respectively. The vanes 35 and 36 are arranged so that their respective vane exit ends will deflect the cylinder fluid into the regions designated by numerals 37 and 38 of the cylinder chamber 39. Again, both the vanes direct the fluid in the same, i.e. clock-wise direction as is indicated by arrows e such as to cause an overall turbulence or angular momentum in the direction of arrow f in the cylinder chamber 39. Most advantageously in the embodiment, the last vanes 35a and 36a, respectively, will tangentially direct the airflow into the adjoining cylinder chamber region, as is indicated by arrow g. In comparison with the embodiment shown in FIG. 5, the embodiment shown in FIG. 6 is capable of delivering a greater angular momentum in the cylinder chamber and the flow coefficient will be increased.

The present invention is particularly applicable to Diesel engines. In a typical example, an engine having a single inlet (FIGS. 1 to 4) and having a cylinder bore of 520 mm diameter, had an inlet opening without the diameter D of 135 mm; the thickness x of the vanes was 3 mm; the dimension s was 60 mm. The inner diameter d then was 90 mm, with 6 vanes curved approximately in the shape shown in FIG. 3 were uniformly distributed around the circumference.

Various changes and modifications may be made within the scope of the inventive concept.

I claim:
1. In an internal combustion engine having
a plurality of inlet openings (31, 32), each communicating with a cylindrical cylinder chamber;
inlet valves providing for controlled addition of a fluid to said cylinder chamber
a plurality of vanes (35, 36) inclined with respect to the axis (A—A) of the chamber and located in said inlet chamber for imparting a curved path to the fluid flowing through said inlet chamber into said cylinder chamber,
respective vanes being associated with respective inlet openings, arranged to deflect fluid only over part of the inlet openings (31, 32), and the vanes (35, 36) associated with respective valves being cooperatingly arranged to tangentially direct the fluid toward external regions (37, 38) of the cylinder chamber (39).

2. Engine as defined by claim 1, wherein further comprising an interface means including a valve seat ring cooperating with said inlet valve and located in said chamber.

3. Engine as difined by claim 2, wherein the interface means comprises a retainer ring (6, 13, 23, 24, 33, 34) said vanes (7, 15, 25, 26, 35, 36), said retainer ring being fastened within said inlet chamber directly adjacent to said valve seat ring.

4. Engine as defined by claim 3, wherein said retainer ring is adjustably secured within said inlet chamber to adjust said retainer ring with respect to said axis (A—A).

5. Engine as defined by claim 1, wherein said vanes have a constant thickness (x).

6. Engine as defined by claim 1, wherein said vanes have an inlet section which is substantially parallel to the flow of the fluid to be admitted to the cylinder chamber.

7. Engine as defined by claim 1, wherein said vanes comprise an exit section which is inclined with respect to the longitudinal axis of said valve.

8. Engine as defined by claim 7, wherein the angle of inclination of said exit sections of said vanes is of from 20° to 40° with respect to a line perpendicular to said axis of said valve and coincidental with the lower base of said retainer ring.

9. Engine as defined by claim 8, wherein the vanes are curved, and the ratio of the length of the chord of said curved vanes with respect to the base distance of one vane to the next on said retaining ring is about 0.8 to 1.2.

10. Engine in accordance with claim 1 having a plurality of valves and inlet channels of different lengths, wherein only the shorter inlet channels are provided with deflecting vanes.

11. Engine in accordance with claim 1, wherein the vanes (35, 36) deflect the fluid in the same direction.

12. Engine according to claim 1 wherein the inner extent of said vanes defines an inner diameter (d), and the inner surface of the chamber defines a base diameter (D);

and wherein the ratio of the inner diameter (d) to the base diameter (D) is in the range of from 0.5 to 0.7.

13. Engine according the claim 1 wherein said vanes and said inlet channel comprise a single unit.

14. Engine according to claim 3 wherein said vanes have a constant thickness (x);

the vanes are curved and the ratio of the the chord of said curved vanes with respect to the base distance of one vane to the next on said retaining ring is about 0.8 to 1.2;

said vanes have an inlet section which is substantially parallel to the flow of the fluid to be admitted to the cylinder chamber;

said vanes comprise an exit section which is inclined with respect to the longitudinal axis of said valve;

and the inner limit of said vanes defines an inner diameter (d), and the inner surface of the chamber defines a base diameter, and wherein the ratio of the inner diameter (d) to the base diameter (D) is in the range of from 0.5 to 0.7.

* * * * *